United States Patent
Cole et al.

(10) Patent No.: US 9,482,449 B2
(45) Date of Patent: Nov. 1, 2016

(54) SUPPORT FOR SOLAR ENERGY COLLECTORS

(75) Inventors: Corey Cole, Richmond, CA (US); Zachary Ardell-Smith, San Leandro, CA (US); John Ciasulli, San Diego, CA (US); Soren Jensen, Mill Valley, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 970 days.

(21) Appl. No.: 13/176,276

(22) Filed: Jul. 5, 2011

(65) Prior Publication Data

US 2012/0180845 A1 Jul. 19, 2012

Related U.S. Application Data

(60) Provisional application No. 61/437,509, filed on Jan. 28, 2011, provisional application No. 61/433,141, filed on Jan. 14, 2011.

(51) Int. Cl.
| | | |
|---|---|---|
| *H01L 31/052* | (2014.01) | |
| *F24J 2/54* | (2006.01) | |
| *F24J 2/52* | (2006.01) | |

(52) U.S. Cl.
CPC ............... *F24J 2/541* (2013.01); *F24J 2/523* (2013.01); *F24J 2002/5468* (2013.01); *F24J 2002/5489* (2013.01); *Y02E 10/47* (2013.01)

(58) Field of Classification Search
CPC .............................. Y02E 10/47; F16C 23/043
USPC ......................................................... 136/244
See application file for complete search history.

(56) References Cited

U.S. PATENT DOCUMENTS

| 1,299,799 A | | 4/1919 | Smalley | |
|---|---|---|---|---|
| 3,929,392 A | * | 12/1975 | Ogino | ..................... F16C 17/02 384/215 |
| 4,429,178 A | * | 1/1984 | Prideaux et al. | ............. 136/246 |

(Continued)

FOREIGN PATENT DOCUMENTS

| JP | 2004-100870 | 4/2004 |
|---|---|---|
| JP | 2004-183830 | 7/2004 |

(Continued)

OTHER PUBLICATIONS

International Search Report and Written Opinion of PCT/US2011/060636, filed Nov. 14, 2011.

(Continued)

*Primary Examiner* — Jennifer Michener
*Assistant Examiner* — Sadie White
(74) *Attorney, Agent, or Firm* — Knobbe, Martens, Olson & Bear LLP

(57) ABSTRACT

A solar energy collection system can include support devices configured to accommodate misalignment of components during assembly. For example, the system can include piles fixed to the earth and an adjustable bearing assembly at the upper end of the pile. The adjustable bearing assembly can include at least one of a vertical adjustment device, a lateral adjustment device and an angular adjustment device. The solar energy collection system can also include a plurality of solar energy collection device pre-wired together and mounted to a support member so as to form modular units. The system can also include enhanced supports for wire trays extending between rows of solar energy collection devices.

26 Claims, 12 Drawing Sheets

(56) References Cited

U.S. PATENT DOCUMENTS

| | | | |
|---|---|---|---|
| 4,789,250 A | 12/1988 | Schluter | |
| 5,228,924 A * | 7/1993 | Barker et al. | 136/246 |
| 5,664,888 A * | 9/1997 | Sabin | F16C 33/108 |
| | | | 384/10 |
| 6,058,930 A * | 5/2000 | Shingleton | 126/600 |
| 6,881,151 B1 * | 4/2005 | Jantz et al. | 464/14 |
| 2006/0062502 A1 * | 3/2006 | Hupp | F16C 11/0614 |
| | | | 384/213 |
| 2007/0274618 A1 * | 11/2007 | Sandin | 384/212 |
| 2008/0000515 A1 * | 1/2008 | Lin et al. | 136/246 |
| 2008/0245360 A1 | 10/2008 | Almy et al. | |
| 2010/0071744 A1 | 3/2010 | Peurach et al. | |
| 2010/0139646 A1 | 6/2010 | Barsun et al. | |
| 2011/0041834 A1 * | 2/2011 | Liao | 126/605 |
| 2012/0216851 A1 * | 8/2012 | Jang | 136/246 |

FOREIGN PATENT DOCUMENTS

| | | |
|---|---|---|
| WO | WO 2007/038760 A2 | 4/2007 |
| WO | WO 2008/058411 | 5/2008 |
| WO | WO 2008/124642 | 10/2008 |
| WO | WO 2010128708 A1 * | 11/2010 |

OTHER PUBLICATIONS

Japanese Notice of Reasons for Rejection mailed Nov. 10, 2015 for Japanese Patent Application No. 2013-549405, in 4 pages.

* cited by examiner

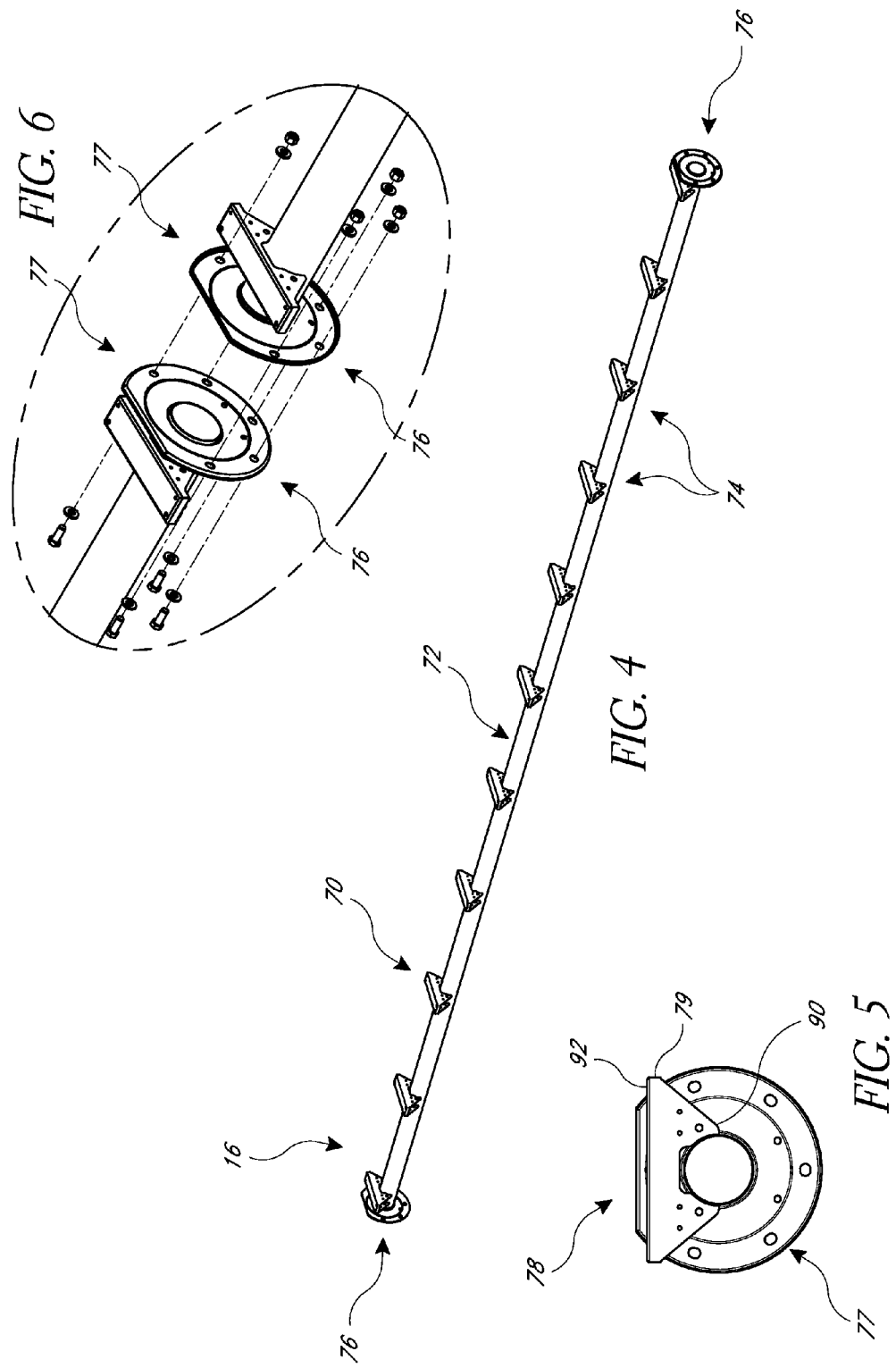

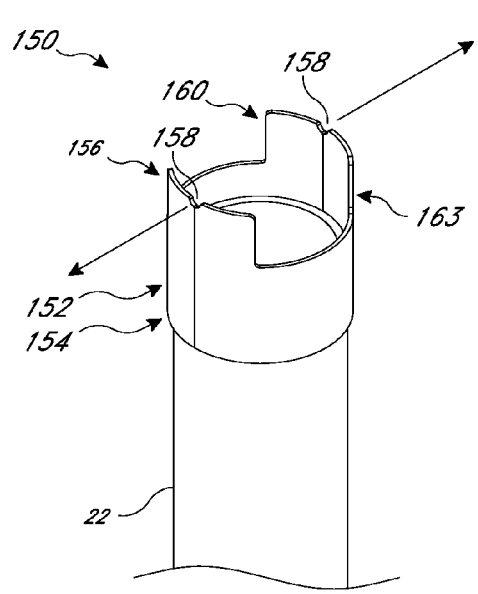
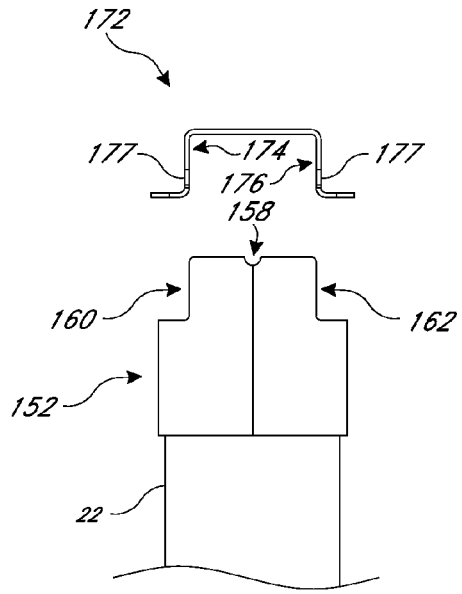
FIG. 12
FIG. 13
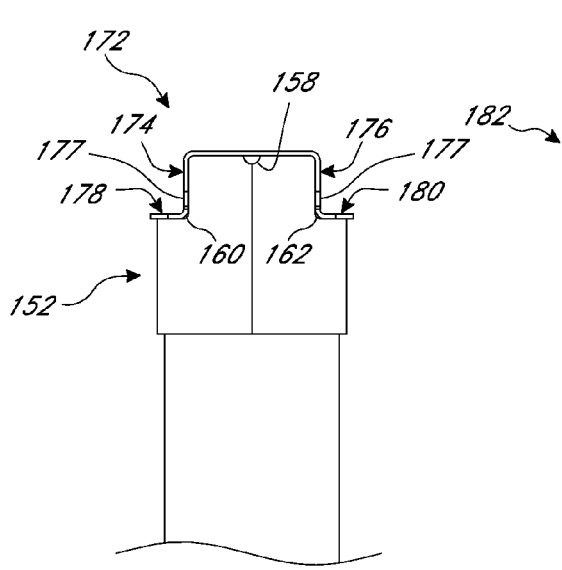
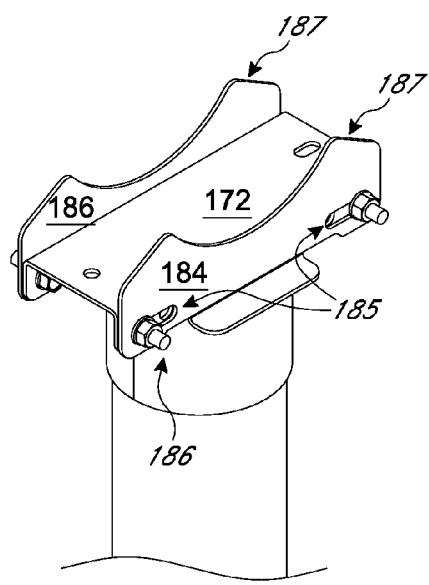
FIG. 14
FIG. 15

SUPPORT FOR SOLAR ENERGY COLLECTORS

RELATED APPLICATIONS

The present application claims priority to U.S. Provisional Patent Application Nos. 61/437,509 filed Jan. 28, 2011 and 61/433,141 filed on Jan. 14, 2011.

STATEMENT REGARDING FEDERALLY SPONSORED RESEARCH OR DEVELOPMENT

The inventions described herein were made with Governmental support under contract number DE-FC36-07GO17043 awarded by the United States Department of Energy. The Government may have certain rights in the inventions disclosed.

TECHNICAL FIELD

Embodiments of the subject matter described herein relate generally to solar energy systems which include supports for solar energy collecting devices.

BACKGROUND

Larger solar collector installations usually include an array of solar collector assemblies. Such systems can be used in conjunction with photovoltaic panels, thermal solar collector devices as well as concentrators for concentrating solar energy onto photovoltaic devices or thermal solar collection devices.

Some of these solar collector installations include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis.

Further, in some of these systems, the torque tube can be used to both support the solar collector devices and transmit the torque used for adjusting the position of the solar collecting devices. In some concentrator systems, efficiency can drop if the mirrors are misaligned by as little as 0.1°. Thus, high performance of such systems is more likely to be achieved if the components of the concentrator arrays are manufactured to precise tolerances. On the other hand, high precision components and complex, time consuming assembly procedures can adversely affect the economic feasibility of such systems.

BRIEF SUMMARY

An aspect of at least one of the inventions disclosed herein includes the realization that costs for constructing solar collection systems can be reduced by accommodating misalignments and certain structural components used for supporting the collectors. For example, in the solar collection systems which incorporate an extended drive shaft or torque tube that is supported above the ground and pivoted through a range of motion, the torque tube is supported by piles that can be mounted to the earth using various techniques such as cementing, driving, screwing (e.g., with helical piles, earth screws, etc.). During the initial construction phase of such a system, these piles or pillars are carefully aligned prior to the final installation step, i.e., pouring cement.

However, events can occur to cause misalignments in the piles. For example, the pillars can be moved or shifted by accident, earthquake, wind, settling, etc. Thus, after curing, the upper ends of the pillars can be misaligned so as to be displaced to the left, to the right, above, or below the desired location relative to the intended rotational axis of the torque tube. Additionally, the pillar can be non-perpendicular to the intended rotational axis of the torque tube.

When such a misalignment occurs, substantial amounts of additional labor may be required to prepare a properly aligned and suitable surface for mounting bearing supporting the torque tube. Because these installations are always outside and can be in remote locations, the costs for customizing such a bearing mount can be high. Additionally, certain expertise, such as certain specific welding skills, may be necessary to provide such a customized and corrosion proof mount.

Thus, in accordance with at least one of the embodiments disclosed herein, a solar energy collection system formed of a plurality of connected solar collection modules can comprise a plurality of piles secured to a ground surface, each of the piles having an upper end. Each of a plurality of support frames can have a first structural support member extending in a first direction of the support frame, can define a pivot axis of the support frame, and can include a first end and a second end opposite the first end. A plurality arrays of photovoltaic solar panels can be supported by the support frames, respectively, each of the plurality of arrays of photovoltaic solar panels being wired to output electrical energy at about the same voltage. A plurality of spherical bearing assemblies can be disposed at the upper ends of the plurality of piles, each of the spherical bearing assemblies can comprise at least a first housing portion mounted to the upper end of one of the plurality of piles, a second housing portion removably connected to the first housing portion and defining an inner bearing race when the second housing portion is connected to the first housing portion, a bushing comprising at least a first bushing portion and a second bushing portion, the first and second bushing portions defining in inner passage forming a close fit with an outer surface of the first structural member. The first and second bushing portions can form a generally spherical outer surface forming a close fit with the inner bearing race, the generally spherical outer surface comprising radial walls extending from in inner portion of the bushing toward the outer spherical surface. Additionally, the outer terminal ends of the radial walls can form a weblike spherical surface with recesses, which in some embodiments, can be configured to accommodate lubricant.

In accordance with another embodiment, an adjustable solar assembly can comprise at least a first pile secured to a ground surface, the pile having an upper end. At least a first support frame can have a first structural support member extending in a longitudinal direction of the support frame. At least a first solar energy collection device can be supported by the first support frame. Additionally, at least a first spherical bearing assembly can be disposed at the upper end of the pile, the first spherical bearing assembly supporting the first support frame so as to be pivotal about at least a first axis.

In accordance with yet another embodiment, an adjustable solar assembly can comprise at least a first pile secured to a ground surface, the pile having an upper end. At least a first support frame can have a first structural support member extending in a longitudinal direction of the support frame. At least a first solar energy collection device can be supported by the first support frame. At least a first spherical bearing assembly can be disposed at the upper end of the pile, the first spherical bearing assembly supporting the first support frame so as to be pivotal about at least a first axis. Additionally, the solar assembly can include a device for allowing the first spherical bearing assembly to be adjusted angularly and laterally relative to the first axis.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is a perspective view of a single torque tube segment having end flanges and saddle members disposed along its length;

FIG. 5 is an enlarged partial sectional view of the torque tube illustrated in FIG. 6;

FIG. 6 is an enlarged and exploded view of the connection between two torque tube segments;

FIG. 12 is an exploded view of the pile and a collar member of the bearing assembly of FIG. 11;

FIG. 13 is a side elevational view of the pile in FIG. 12 with the collar member secured to the pile and an exploded view of a base plate member;

FIG. 14 is a further side elevational view of the base plate seated on the collar member;

FIG. 15 is a perspective view of the assembly illustrated in FIG. 14 with lateral adjustment plates mounted to the base plate;

DETAILED DESCRIPTION

Figure 1:
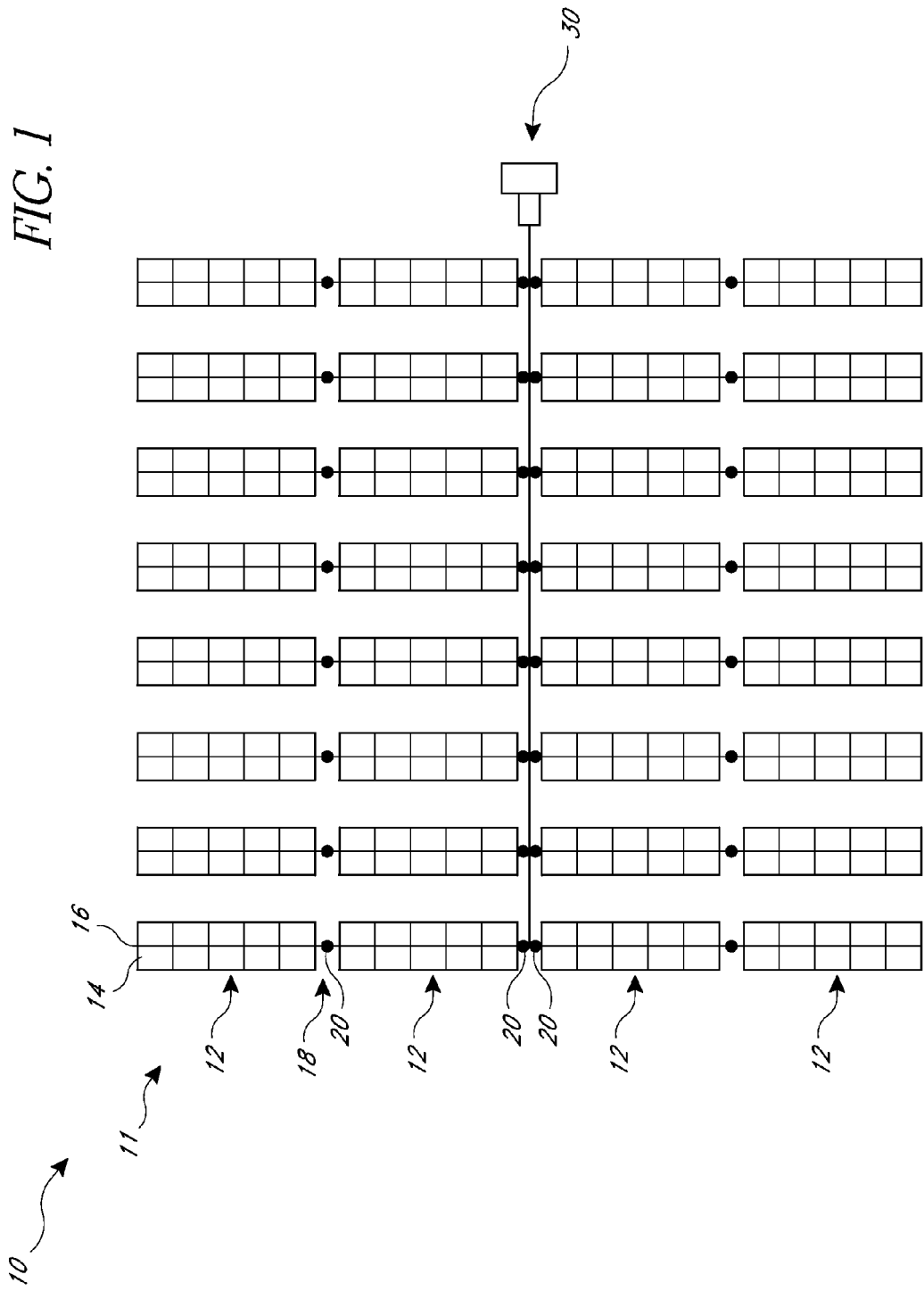
FIG. 1 is a schematic top plan view of a solar collector system including an array of solar collector modules in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Locating connector"—The following description refers to devices or features being connected with a "locating connector". As used herein, unless expressly stated otherwise, "locating connector" means that one element/node/feature is directly or indirectly joined to (or directly or indirectly communicates with) another element/node/feature with a mechanism that connects and also provides a locating function, such as for example but without limitation, alignment of elements/nodes/features or enhancing contact between two elements/nodes/features.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are described in the context of photovoltaic arrays and modules. However, these inventions can be used in other contexts as well, such as concentrated PV systems, thermal solar systems, etc.

In the description set forth below, a solar energy collection system 10 is described in the context of being formed by a plurality of solar collection modules. Each of the modules can include a support member supporting a plurality of solar collection devices as well as wiring for connecting the various solar collection devices to each other and to other modules. The system can also include devices for reducing labor, hardware, or other costs associated with installing such a system. For example, the collection system or the modules included in such a system can be supported above the ground with bearing assemblies that include one or more various features designed to accommodate misalignments that may result during the installation of mounting piles. Further, the modules can include other features for simplifying the manufacture of such modules and the arrangement and installation of such modules at an installation site.

FIG. 1 illustrates the solar collection system 10 including a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a pile and an adjustable bearing assembly 20, described in greater detail below with reference to FIGS. 11-17.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 are connected to each other in an end to end arrangement. However, inventions disclosed herein can be used in the context of other types of arrangements. For example, the system 10 can include a plurality of modules 12 that are arranged such that the torque tube 16 is inclined relative to horizontal, wherein the torque tubes 16 are not connected in an end to end fashion, such as the arrangement illustrated and disclosed in U.S. Patent Publication No. 2008/0245360. In that context of the use, the adjustable bearing assemblies 20 can be used in place of the bearings identified by the reference 40 in FIG. 6 and described in paragraph [0033] as well as bearings identified by the reference 72 in FIG. 8 and described in paragraph [0037] of the 2008/0245360 patent publication. The entire contents of the 2008/0245360 patent publication is hereby expressly incorporated by reference including the illustrations and the descriptions of the bearings 40 and 72.

Figure 2:
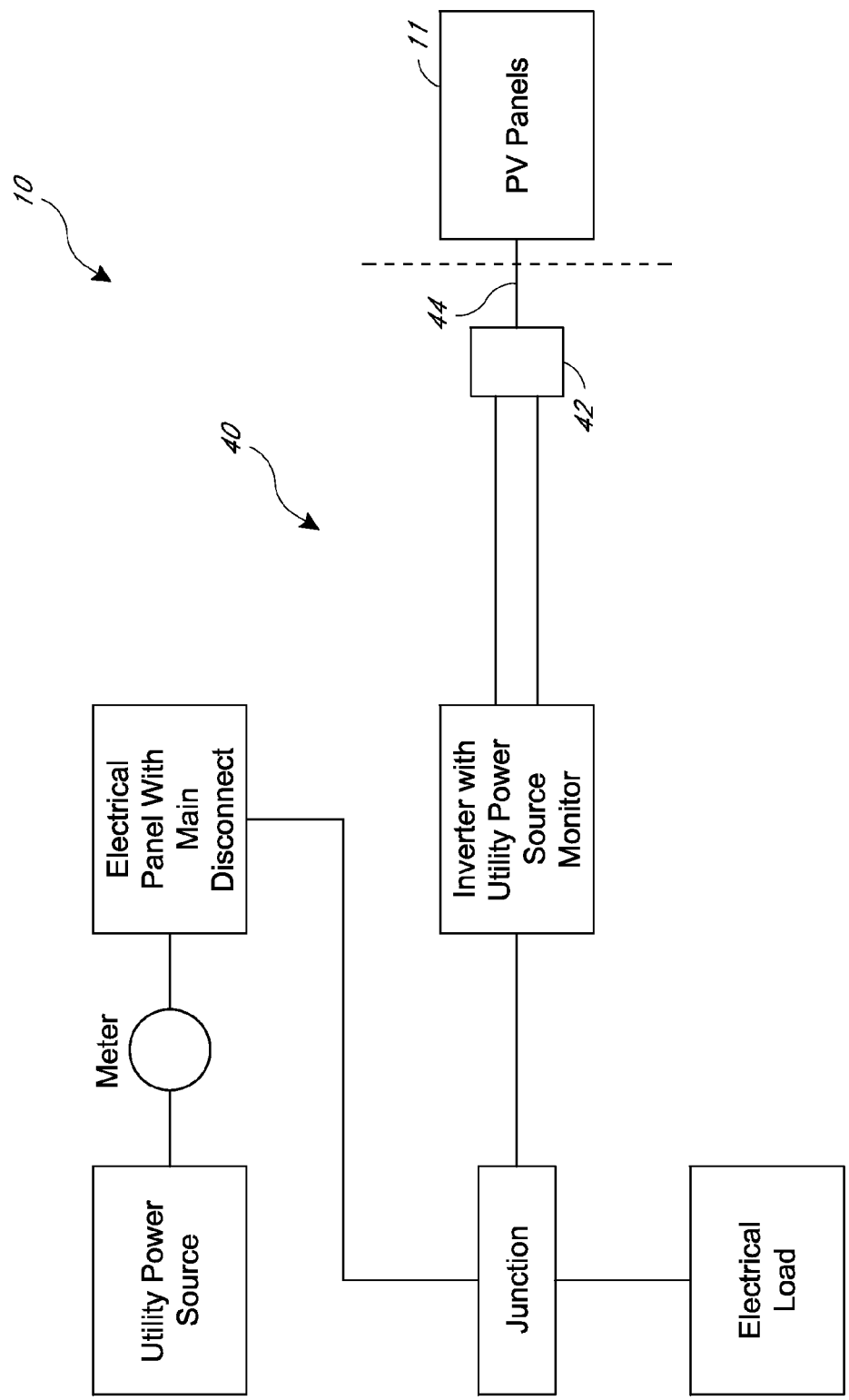
FIG. 2 is a schematic diagram of the system illustrated in FIG. 1 illustrating optional electrical connections of the collector system with various electrical components.

In embodiments where the torque tubes 16 are arranged horizontally and the modules 12 are connected in an end to end fashion, the adjustable bearing assemblies 20 can be used in place of the bearings mounted on top of supports 16 in FIG. 2 of U.S. Patent Publication No. 2010/0139646.

Further, the drive system 30 can be constructed and operated in the manner disclosed with regard to the tilt assembly 50 of U.S. Patent Publication No. 2010/0139646. The entire contents of U.S. Patent Publication No. 2010/0139646 is hereby expressly incorporated by reference.

Additionally, the solar collection devices 14 can be in the form of photovoltaic panels, thermal solar collection devices, concentrated photovoltaic devices, or concentrated thermal solar collection devices. In the illustrated embodiment, the solar collection devices 14 are in the form of photovoltaic panels.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 3:
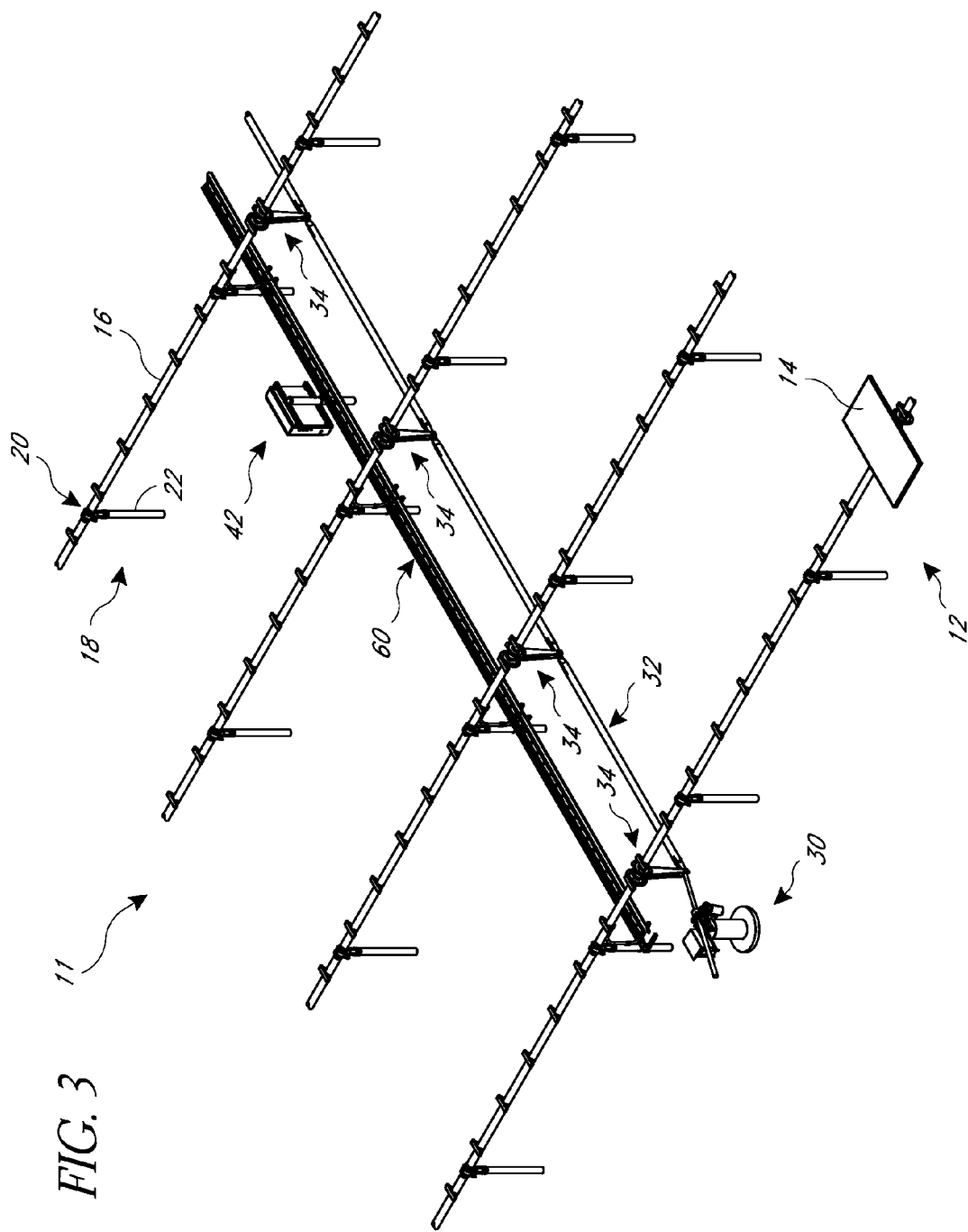
FIG. 3 is a perspective view of the solar collection system of FIG. 1, and illustrating a tracking drive system, a plurality of piles mounted to the ground and supporting a plurality of torque tubes, in accordance with an embodiment.

FIG. 3 illustrates the array 11 with all but one of the solar collection devices 12 removed. As shown in FIG. 3, each of the support assemblies 18 includes the adjustable bearing member 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include an electrical wire tray 60 supported by one or more of the piles 22, or by other means.

With reference to FIG. 4, as noted above, the torque tube 16 can be constructed in one or more parts. For example, as shown in FIG. 4, a portion of torque tube 16 is identified by the reference 70 and is referred to herein as a "torque tube module". The torque tube module can include a central shaft member 72, one or more mounting devices 74, and one or more connection devices 76.

The body member 72 can be in the form of any type of elongated member, having any cross sectional shape such as square, round, rectangular, or other shapes. In the illustrated embodiment, the body member 72 is round. Commercially available welded, drawn, rolled, or cold-worked pipe can be used as the body member 72, however, other structural components can also be used. In the illustrated embodiment, the body member 72 is formed of five-inch (outer diameter) ERW (electro-welded) pipe.

The connection devices 74 are configured to support the solar collection devices 14. In the illustrated embodiment, as noted above, the solar collection devices 14 are in the form of photovoltaic panels. Thus, in the illustrated embodiment, the connection devices 74, are configured to support and be securely attached to a lateral edge of one or more photovoltaic panels. As such, nearly all of the connection devices 74 support and are rigidly fixed to the juxtaposed edges of two photovoltaic panels. However, other configurations can also be used.

The connection member 76 can have any configuration. In the illustrated embodiment, the connection devices 76 are in the form of round flanges having a diameter of approximately 368 mm. Additionally, in some embodiments, the upper edge of the flange member 77 can include a clearance portion 78. In the illustrated embodiment, the clearance portion 78 is a flat area shaped to prevent the flange member 77 from contacting the solar collection devices 14. However, other configurations can also be used.

With continued reference to FIG. 5, the connection devices 74 can be in the form of a saddle member 79 having a connecting portion 90 configured to be directly connected to the body member 72. Additionally, the connection device 79 can include an upper mounting portion 92. In the illustrated embodiment, the upper mounting portion 92 is a flat surface configured to receive fasteners used to securely connect an edge of a photovoltaic panel thereto.

Optionally, the connecting devices 74 can be mounted to the body member 72 before the torque tube 16 or torque modules 76 are delivered to an installation site. For example, the torque tube module 76 can be manufactured in a method where a series of mounting devices 74 are placed on a machine-leveled table, at the spacing which will accommodate the mounting of the desired solar collecting devices 14. After the connecting devices 74 have been placed, face down, on such a table, at the desired spacing, the body member 72 can be lowered onto the connecting portion 90. In some embodiments, the leveled table can include holes for pins used to maintain the mounting devices 74 in the desired location. Thus, as the body member 72 is lowered onto the connecting devices 74, the connecting devices 74 are less likely or cannot move.

Optionally, the ends of the body member 72 can be placed in the desired position relative to the connecting devices 74 and held in place with tools to ensure the correct relative orientation of the body member 72 to the connecting member 74. The body member 72 can then be tack welded to each connecting member 74, allowing for normal manufacturing tolerances associated with the body member 72. Twisting and bowing of the body member 72 can be eliminated by welding smaller or larger gaps at each of the connecting portions 90 of the connecting devices 74. After the connecting devices are mounted to the body member 72, the flanges 77 can be aligned such that the clearance portion 78 is aligned with the upper surface 92 of the connecting member 74. With the flange members 77 in place, the flange members 77 can also be welded to the body member 72. Optionally, the flange member 77 can be designed to slide along the length of the body member 72 such that the distance between the flanges 77 can be set at a desired distance and thereby accommodate length variations of body member 72. Such an assembly process can better ensure the desired placement in mounting of the connector member 74 on the body member 72, where the body member 72 is made from lower tolerance structural materials, thereby allowing the torque tube 16 to be formed with lower cost materials.

As shown in FIG. 6, where a torque tube 16 is made from a plurality of pieces joined together, the connection devices 76 can be connected to one another in a face to face arrangement. The technique used for connecting the connection devices 76 can be any known technique. In the illustrated embodiment, the connection devices 76 are connected with threaded fasteners extending through holes aligned in both of the flange members 77. However, other configurations can also be used.

Figure 7:
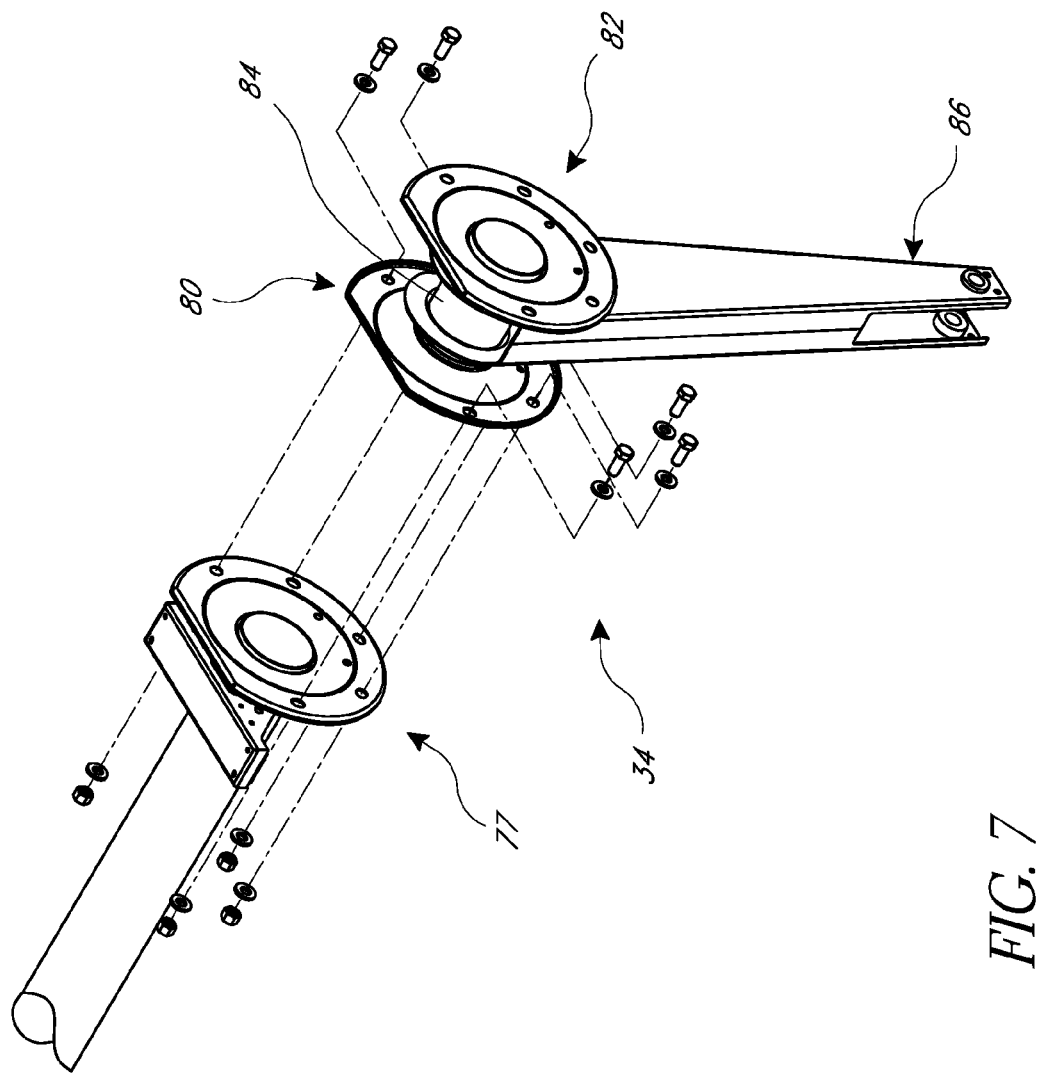
FIG. 7 is an enlarged exploded view of a torque arm assembly that can be used to connect the torque tube to the tracking drive system of FIG. 3.

With reference to FIG. 7, the drive assemblies 34 can be configured to mate with the flange members 77. For example, the drive assemblies 34 can include one or more flange members 80, 82 that are designed to mate with the flange members 77. The flange members 82 can be connected with a connector member 84. In the illustrated embodiment, the connector member 84 is a short piece of the same structural member used to form the torque tube 16.

The drive assemblies 34 can also include one or more arms 86 having upper ends attached to the connector member 84 and lower ends configured to operably engage with the drive strut 32 (FIG. 3). In the illustrated embodiment, the arms 86 are generally trapezoidal in shape. However, other shapes can also be used.

Further, the upper end of the arms 86 are rigidly fixed to the connector member 84 or the flanges 80, 82 such that when the arms 86 are pivoted by the drive strut 32, the flanges 80, 82 rotate with the arm 86 about the longitudinally pivot axis of the torque tube 16, and thereby through the connection with the flange member 77, rotate the torque tubes 16.

Figure 8:
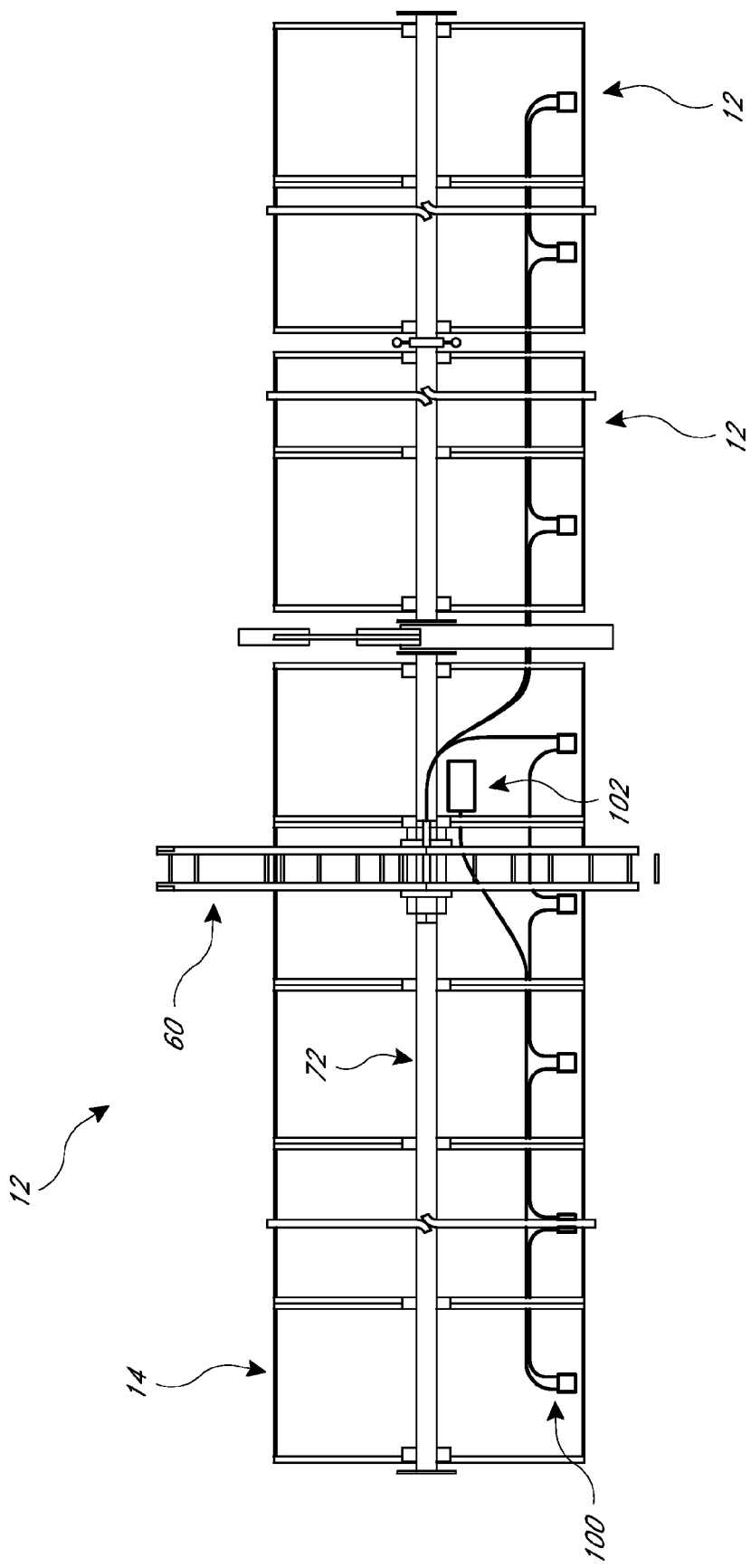
FIG. 8 is a side elevational view of a plurality of solar collector modules rotated to a generally vertical orientation and illustrating the electrical connection of each of the solar collector devices mounted on each of the modules and the arrangement of wires extending to a tray.

With reference to FIG. 8, the collector modules 12, as noted above, can include a plurality of solar collecting devices 14 electrically connected together so as to form a single unit that can be readily electrically connected to other modules 12. In this context, each module 12 can be formed by one or more body members 72 connected together with flanges 77 or other types of connecting devices. In the illustrated embodiment, each of the solar collecting devices 14 include a photovoltaic box 100 connected to each individual device 14. Each of the boxes 100 can be configured to control electrical power generated by the collection device 14 to be eventually delivered to the combiner box 42 (FIG. 2). Optionally, the photovoltaic box 100 can be further configured to be connected, in series or in parallel, with every collecting device 14 included in a single module 12. In some embodiments, the boxes 100 can be configured to cooperate to output power at a voltage of 100 volts or any other voltage. Optionally, each module 12 can include a further junction box 102 configured to be connectable to all the boxes 100, in series or in parallel, and to regulate the total power output by all of the collection devices 14 with desired output characteristics, such as a voltage of 100 volts.

This type of wiring configuration conveniently allows the modules 12 which are aligned axially with each other to be electrically connected together and/or connected to further devices for controlling electrical power output from the devices 14. As noted above with reference to FIG. 3, the array 11 can include an electrical support tray 60, a portion of which is illustrated in FIG. 8.

Figure 9:
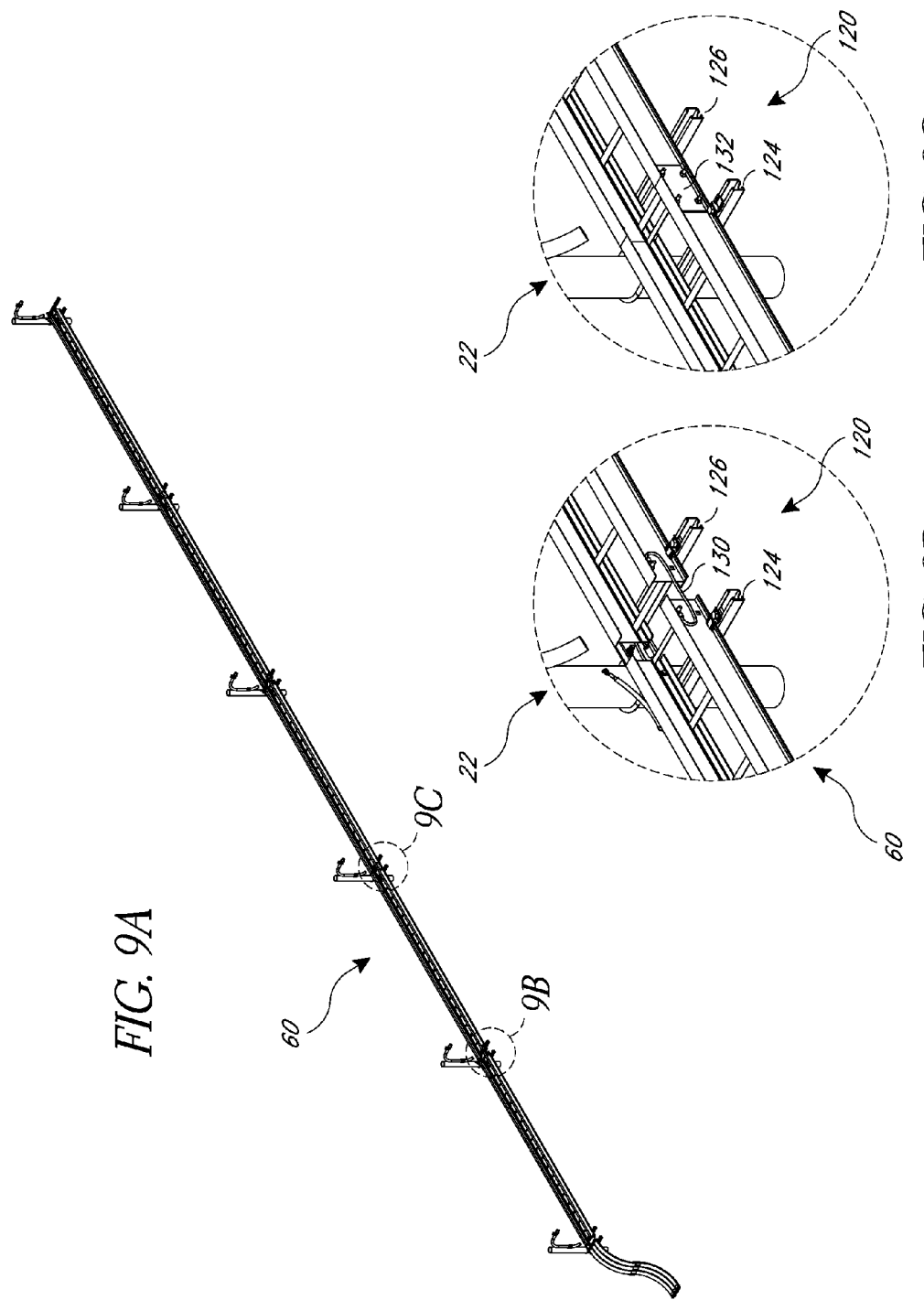
FIG. 9A is a perspective view of an electrical tray illustrated in FIG. 3.
FIG. 9B is an enlarged perspective view of an optional connection between segments of the electrical tray illustrated in FIG. 9A.
FIG. 9C is an enlarged perspective view of another optional connection between segments of the electrical tray illustrated in FIG. 9A.

As shown in FIG. 9A, FIG. 9B, and FIG. 9C, the electrical tray 60 can be formed by one or more segments of a ladder like structural assembly. The tray can be shaped and sized to allow the electrical wires 44 (FIG. 1) to extend along the axially aligned modules 12 to the tray 60, and then extend, in a position raised above the ground, to the combiner box 42.

With reference again to FIGS. 9B and 9C, the tray 60 can be formed of a plurality of pieces connected together with joints, such as butt joints, or other types of joints. FIG. 9B illustrates an optional expansion joint formed with a spring member 130. As such, the spring member 130 can allow for relative axial movement of the plurality of members forming the tray 60.

FIG. 9C illustrates a splice joint performed with a connector plate 132 which fixes the juxtaposed ends of the pieces of the tray 60 where expansion joints are not desired.

The tray member 60 can be connected to and thereby supported by the pillars 22 in any known manner. In the illustrated embodiment, the tray 60 is supported by a two-armed support assembly 120.

Figure 10:
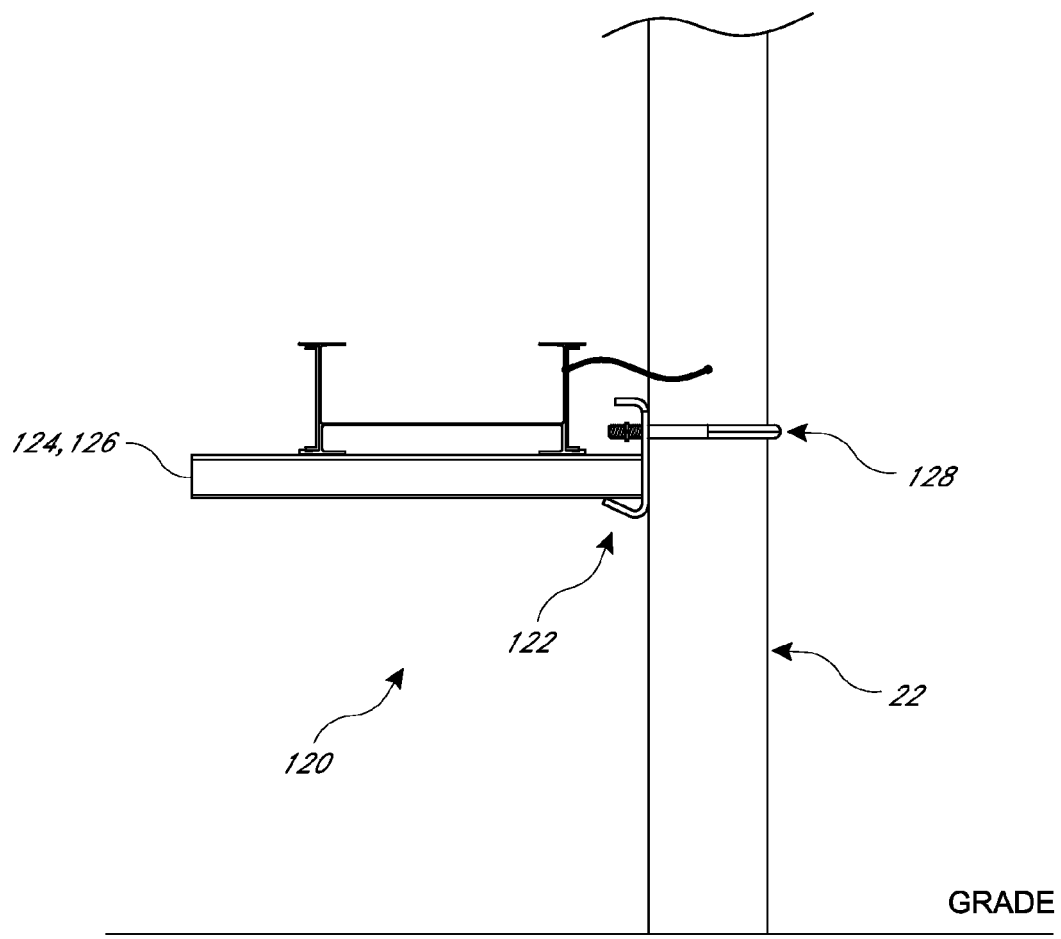
FIG. 10 is a schematic elevational view of a tray support device that can be used the support the electrical tray illustrated in FIG. 9A.

With reference to FIG. 10, the two armed support assembly can be formed in any known manner. In the illustrated embodiment, the support assembly 120 includes a base plate 122 which can have a generally channel-shaped configuration. However, other configurations can also be used.

Two support arms 124, 126 are securely fixed to the base plate member 122. For example, the arms 124, 126 can be welded to the base plate 122. In some embodiments, the assembly 120 includes a U bolt mount 128 which includes a U bolt having threaded ends which extend to apertures in the base plate 122. Threaded fasteners, such as bolts, can then be used to secure the assembly 120 to a pile 22 at any desired height. This can provide an advantage where the grade of the ground, into which the piles 22 are mounted, varies. Thus, during an installation, if it is determined that a portion of the tray 60 is not sufficiently spaced above the ground, the support device 120 can be raised conveniently. Optionally, a ground wire 129 can electrically connect the tray 60 to the pile 22 so as to electrically ground the tray 60.

With continued reference to FIG. 10, the base plate 122 can optionally include slots (not shown) so as to allow the orientation of the base plate 122 relative to the pile 22 to be adjusted, for example, where the pile 22 is not sufficiently vertical. Further, having two spaced apart arms 124, 126 allows the joints, whether a expansion joint or splice joint is used, to fall between the two arms 124, 126, thereby reducing the need for additional supports for the tray 60. Further, the length of the arms 124, 126 can be chosen so as to accommodate various different sizes of trays 60.

With reference to FIGS. 11-17, the adjustable bearing assembly 20 can include one or more adjustment features providing for accommodation of misalignments of the piles 22 during construction of the system 10. For example, the bearing assembly 20 can include a height adjustment device 150, a lateral adjustment device 170, and/or an angular adjustment device 190. Each of these adjustment devices 150, 170, 190, can be used alone or in various combinations or any combination with each other.

For example, the vertical adjustment device 150 can allow the adjustable bearing assembly 20 to be adjusted in a vertical direction along the direction of arrow V. Adjusting the device 150 as such, will move the central axis Z of the adjustable bearing assembly 20 up and down relative to the pile 22. The lateral adjustment device 170 can be configured to allow the portion of the bearing assembly 20 to be adjusted along the lateral direction L such that the axis Z of the bearing assembly 20 can be adjusted laterally relative to the axis of the pile P. Further, the angular adjustment device 190 can be configured to allow the axis Z of the bearing device 20 to be adjusted angularly, in the direction of arrow A, relative to the axis of the pile P.

The embodiments of the vertical adjustment device 150, the lateral adjustment device 170, and the angular adjustment device 190 described below are examples of the mechanisms that can be used to perform the functions of the devices 150, 170, 190. However, other mechanisms can also be used.

With reference to FIG. 12, the vertical adjustment device 150 can include a collar member 152. The collar member 152 can include a lower end 154 and an upper end 156. The lower end 154 of the member 152 can be configured to fit within or around the outside of the pile 22. In some embodiments, the pile 22 has a round outer surface and the lower end 154 includes a round inner surface. The round inner surface of the lower end 154 can be provided with a diameter that is close to and/or slightly larger than the outer diameter of the pile 22.

Thus, the member 152 can be placed over the upper end of the pile 22 and positioned at a desired height. In some embodiments, the member 152 can include alignment notches 158 configured to be useable in conjunction with a line of sight alignment device. As such, an installer can position the member 152 at the proper height and angular position in accordance with the alignment procedure used. For example, the notches 158 can be aligned to fall along an axis X such that the axis X lies at least parallel to the intended orientation of the axis Z about which the torque tube 16 should pivot.

With reference to FIG. 13, the member 152 can be secured in place at the desired height and orientation relative to the pile 22. For example, but without limitation, the member 152 can be welded to the pile 22.

The lateral adjustment mechanism 170 can include a base plate 172 (illustrated in FIGS. 13 and 14) configured to contact a portion of the member 152 in a manner to accommodate a sufficiently strong connection and/or to provide a locating function. In some embodiments, the member 152 includes alignment notches 160, 162 on opposite sides of the alignment notches 158. In the illustrated embodiment, the base member 172 can be shaped to cooperate with the alignment notches 160, 162, or other parts of the member 152, to locate the base member 172 in a predetermined orientation relative to the member 152.

In the illustrated embodiment, the base member 172 includes sidewalls 174, 176 that are shaped and spaced to correspond to the notches 160, 162, respectively. Thus, as shown in FIG. 14, when the base member 172 is mated with the member 152, the sidewalls 174, 176 are located by the notches 160, 162. Optionally, as shown in the illustrated embodiment, the base member 172 also includes flange members 178, 180 which are shaped to cooperate with lower portions of the notches 160, 162 so as to provide a further locating function for the member 172 in the vertical direction relative to the member 152. The base member 172 can be attached to the member 152 with any type of fastening technique, including welding, bonding, threaded fasteners, etc. Additionally, the base member can include apertures 177, 179, described below with reference to FIG. 15.

With reference to FIG. 15, the lateral adjustment device 170 can further include the bearing housing support portion 182. The bearing housing support portion 182 can be configured to be adjustable in the lateral direction L relative to the base member 172.

In some embodiments, the bearing housing support member 182 is formed with first and second support members 184, 186, each of which include lateral adjustment portions 185. In the illustrated embodiment, the lateral adjustment portions 185 are in the form of slots extending generally in the lateral direction L. The slots 185 are positioned so as to overlap with one or more apertures defined in the base member 172.

Threaded fasteners 186 can be inserted through the slots 185 and one of the holes 177, 179, depending on the lateral position of the bearing housing supports 184, 186 relative to the base member 172. Other lateral adjustment devices can also be used. In some embodiments, the slot 185 is approximately 1½ inches long. However, other sizes and ranges of adjustment can also be used.

Figure 16:
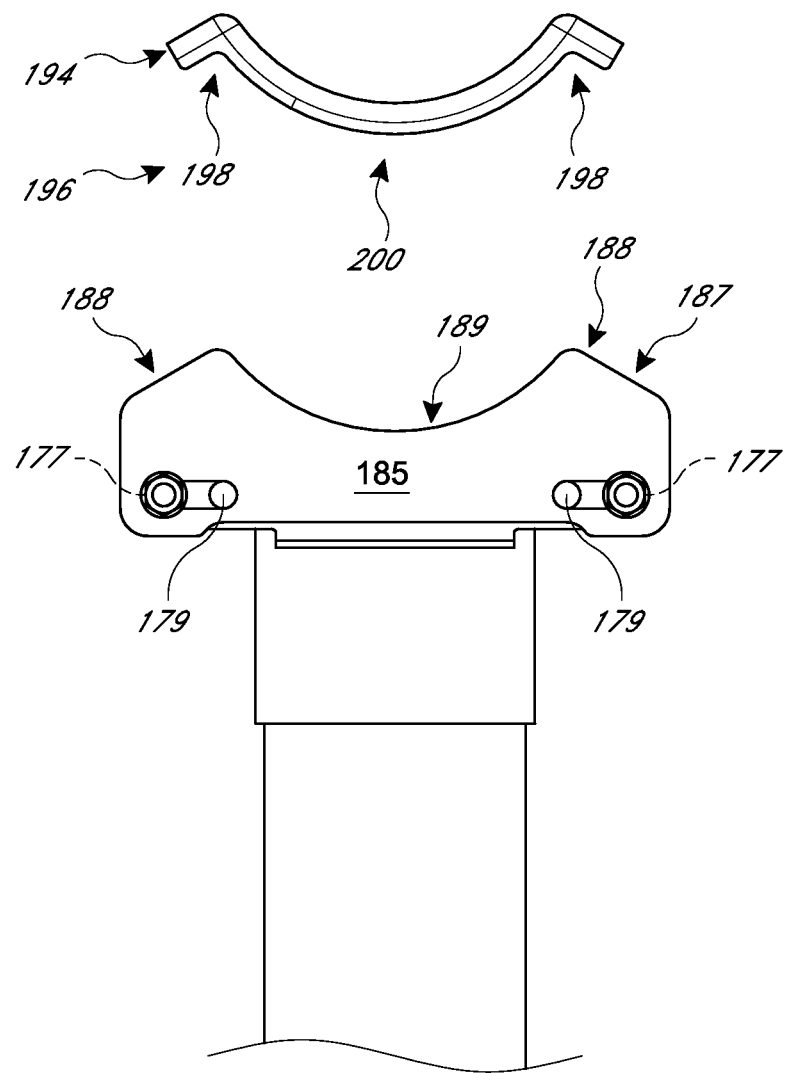
FIG. 16 is a front elevational view of the assembly in FIG. 15 with an exploded view of a first bearing housing member.

The bearing housing support members 184, 186 can also include a bearing housing support portion 187 which can be shaped to correspond to the shape of an outer surface of a bearing housing. For example, as shown in FIG. 16, the bearing housing support portion 187 includes laterally outer portions and a central portion 189. In the illustrated embodiment, the lateral outer portions 188 are generally flat and straight and the central portion 189 is curved. However, other shapes can also be used, for example, shapes which correspond to the desired bearing housing.

Figure 11:
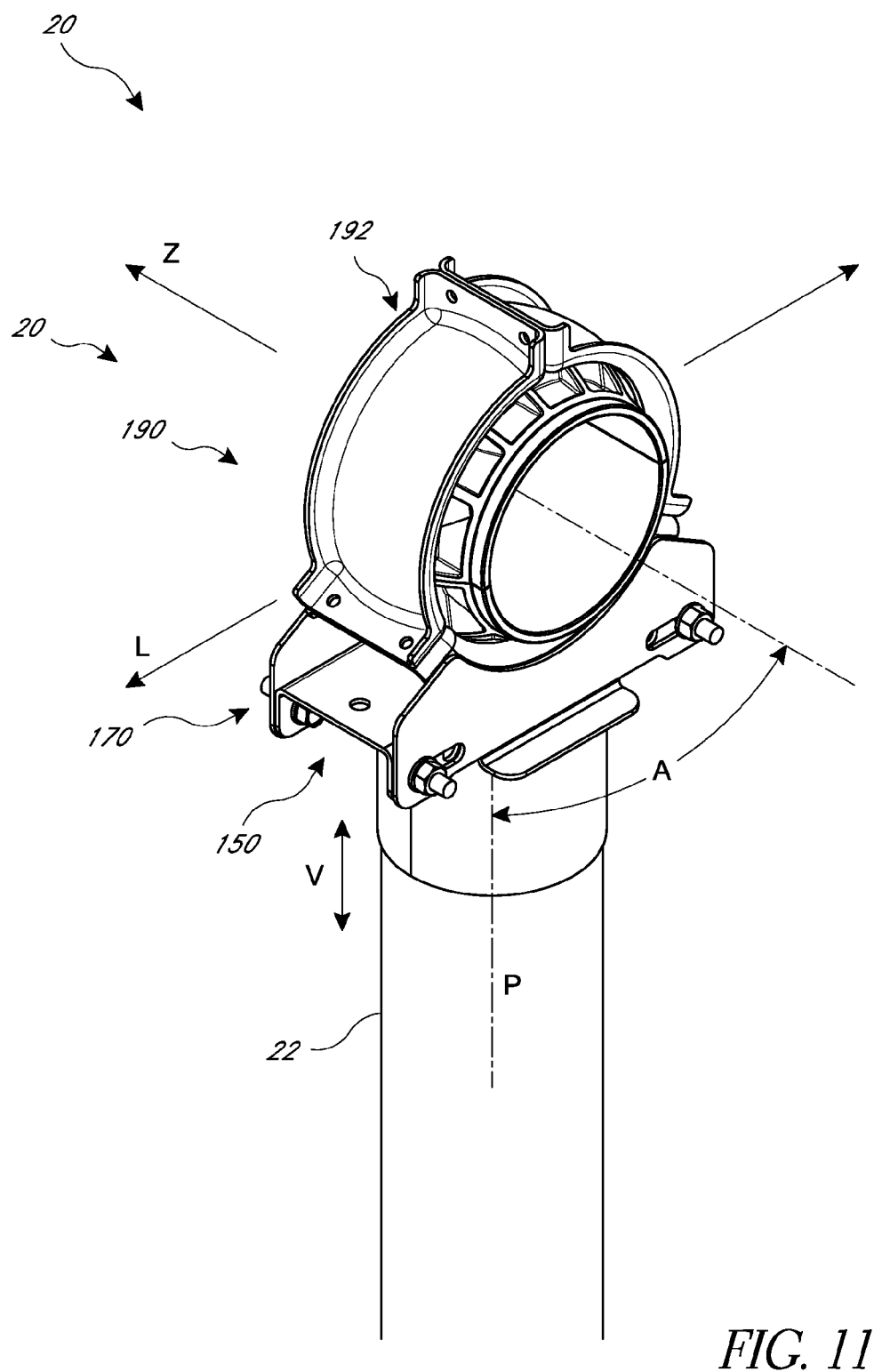
FIG. 11 is a perspective view of a pile and bearing assembly that can be used with the system of FIG. 1.

FIG. 16 illustrates a first portion of a bearing housing 192 (FIG. 11). The first portion 194 of the bearing housing 192 includes a support surface 196 which includes laterally outer portions 198 and a central curved portion 200. In the illustrated embodiment, the laterally outward portions 198 are generally flat and straight and are oriented at approximately the same angle of inclination as the laterally outer portions of 188. Similarly, the curved portion 200 corresponds to the shape of the central portion 189.

Figure 17:
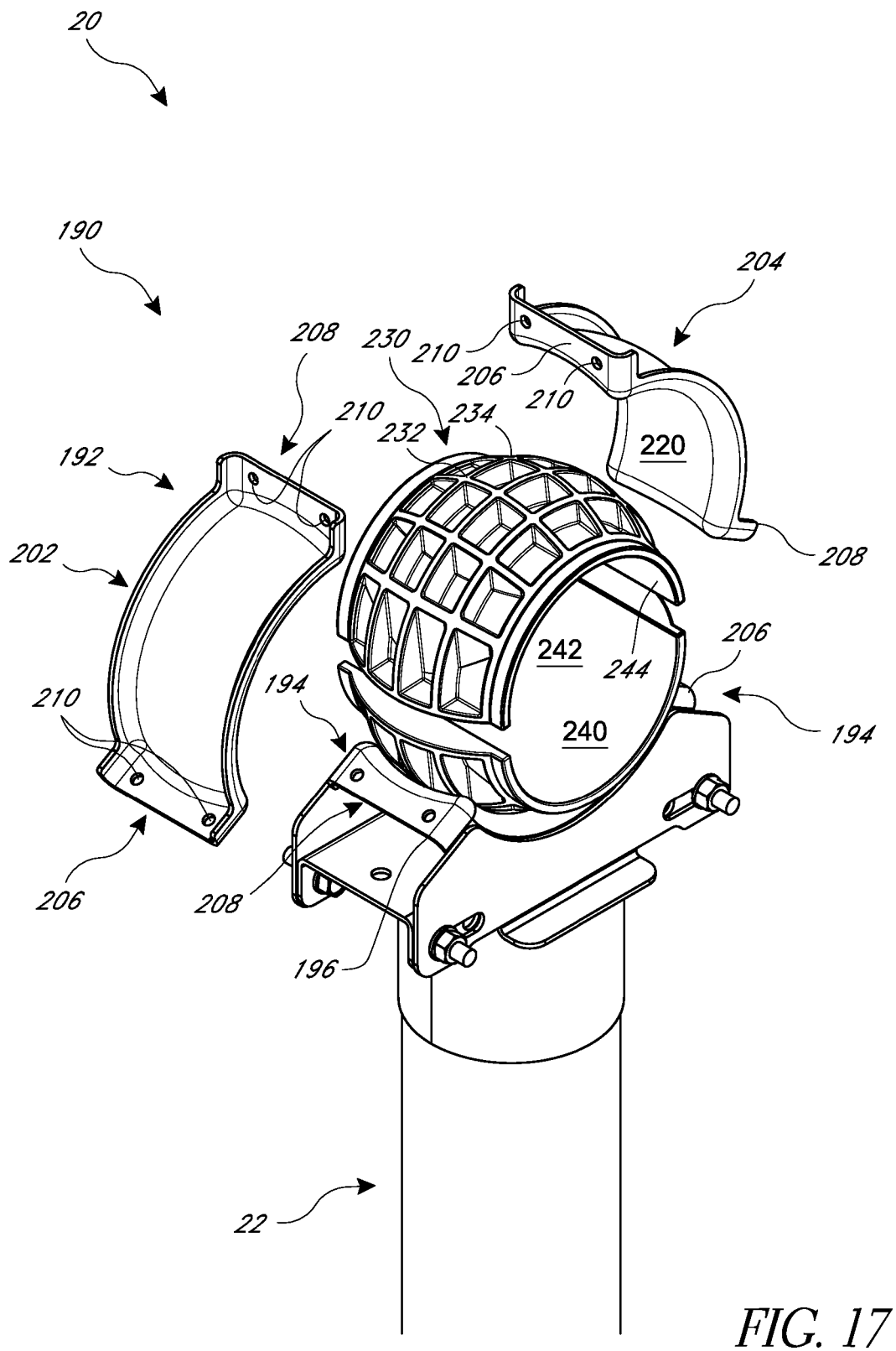
FIG. 17 is a perspective view of the assembly illustrated in FIG. 16 with the first bearing housing member attached to the lateral adjustment plates and an exploded view of the bearing members and additional bearing housing members.

With reference to FIG. 17, with the support portion 196 of the bearing housing portion 194 placed on the support portion 187 of the members 185, 186, the first portion 194 of the bearing housing is positively engaged with the support surface 187. The first portion of the bearing housing 194 can be attached to the members 185, 186 with any known technique, including for example, but without limitation, welding, bonding, threaded fasteners, etc.

With continued reference to FIG. 17, the first portion of the bearing housing 194 connected to the members 185, 186 as such, provides for a defined orientation of the entire assembled bearing housing 192. In the illustrated embodiment, the bearing housing 192 is formed in three sections, including the first portion 194, a second portion 202 and a third portion 204. In this configuration, each of the bearing housing portions 194, 202, 204 each have an identical shape and extend around approximately 120 degrees of an arch.

Additionally, each of the housing portions 194, 202, 204 can include mounting flanges 206, 208 configured to be mateable to adjacent flanges 206, 208 on the adjacent bearing housing portion. In the illustrated embodiment, each of the bearing housing portions 194, 202, 204 include apertures 210 configured to receive threaded fasteners so that the bearing housing portions 194, 202, 204 can be fixed to each other, as illustrated in FIG. 11.

With continued reference to FIG. 17, each of the bearing housing portions 194, 202, 204 can include a bearing race surface 220. With all of the bearing housing portions 194, 202, 204, connected with one another, the respective inner surfaces 220 are aligned to form a complete bearing race. The surfaces 220 can be concave in the axial direction Z of the adjustable bearing assembly 20 so as to form a partially spherical bearing race. However, other configurations can also be used.

The angular adjustment device 190 can also include a bearing member 230 configured to be rotatable about the axis Z when the bearing housing 192 is assembled (as illustrated in FIG. 11). Additionally, the bearing member 230 can be configured to be angularly pivotable relative to the axis Z, in the direction of angle A (FIG. 11). Thus, in the illustrated embodiment, the bearing member 230 includes a partially spherical outer surface 232 that is shaped to correspond to the inner surfaces 220 of the bearing housing 192.

The surface 232 can be longer, in the axial direction Z, than the bearing housing 192. Thus, as the bearing 232 is pivoted in the direction of angle A, the bearing surface 232 continues to provide sufficient load bearing contact with the surface 220.

Optionally, as illustrated in FIG. 17, the outer surface 232 can be in the form of a web shape. For example, in some embodiments, the surface 232 can generally follow along a partial spherical surface but also include one or more recesses 234. The recesses 234 can be used to receive a lubricant such as grease. Some of the recesses disposed around a central band of the outer surface 232 can be permanently covered by the surfaces 220 when the housing 192 is assembled. As such, the centrally located recesses 234 can better protect lubrication such as grease disposed in those recesses from weather contaminants and also reduce the amount of lubricant that may leak out. In some embodiments, no lubricant is used.

The bearing 230 can also include an inner surface 240 configured to correspond to the outer surface of the torque tube 16. For example, the inner surface 240 can be formed with an inner diameter that is nearly the same as or slightly larger than the diameter of the outer surface of the body 72 of the torque tube 16. As such, when the bearing 230 is positioned over the outer surface of the body 72, the inner surface 240 can contact the outer surface of the body 72.

In some embodiments, the bearing 230 can be sized such that the inner surface 240 provides sufficient clearance about the outer surface of the torque tube that the torque tube body 72 slides against the inner surface 240. Thus, during use of the torque tube body 72 in the context of a pivoting assembly for allowing the PV panels 14 to track the sun, the bearing 230 can remain stationary in the housing 192 while the torque tube 16 pivots relative to and thus slides against the inner surface 240.

As illustrated in FIG. 17, the bearing 230 can be a "split" type bearing, made from two halves. A split bearing member 230 can provide an advantage in the assembly of the array 11. For example, during the assembly of the array 11, the lower portion of the adjustable bearing assembly 20 can be mounted to the piles 22, but with the bearing housing portions 202, 204 and the upper half 244 of the bearing 230 omitted. As such, a torque tube 16 can be laid on the lower halves 242 of the bearings 230.

After positioning the torque tube 16 as such, the upper half 244 of the bearing 230 and the other bearing housing portions 202, 204 can be connected to each other and assembled around the bearing 230. Additionally, this configuration allows the torque tube 16 to be preassembled with the flanges 77 and attachment devices 74 fixed to the body 72 (FIG. 4), as well as pre-treated with anti-corrosive coatings. More specifically, for example, it is not necessary to slide a single piece bearing member over the body 72, which would not be possible with the connecting members 74 pre-attached to the body 72 of the torque tube 16.

With continued reference to FIGS. 17 and 11, constructing the bearing housing 192 in three parts, can provide additional advantages. For example, the three part construction of the bearing housing 192, during the process of assembly, is more easily aligned around the outer bearing surface 232 of the bearing 230. For example, if the bearing house 192 were formed in two pieces, each extending 180 degrees around the bearing 230, the larger amount of contact between the inner surface 220 and the outer surface 232 can make it more difficult to align mounting flanges of the housing 192.

Further, although the bearing housing 192 can be made in two pieces, each extending about 180 degrees around the bearing 230, forces acting on such a bearing assembly 220 may tend to load the fasteners used to connect the flanges 206, 208, in tension. This is because, it has been observed that when using the solar array 11, wind loads can also cause lift against the modules 20, as well as forces in other directions. Thus, regardless of the orientation of the flanges that might be used to form a two piece bearing housing, the fasteners can be loaded in tension under certain circumstances.

On the other hand, the three piece configuration of the housing 192 results in forces that act on the fasteners 210 at least partially in shear. Thus, the durability of the bearing housing 192 can be enhanced in the three piece configuration shown in FIGS. 11-17. Similarly, the housing 192 can be made in more than three pieces, or two pieces as desired.

Further, the three piece configuration of the housing 192 allows the support members 184, 186 (FIG. 15) to be smaller yet still provide positive engagement of three surfaces on the bearing housing portion 194. Where the housing 192 is made in two parts, extending about 180 degrees about the bearing 230, the support members 185, 186, in order to make contact with three surfaces of the lower portion of such a housing, the support members 185, 186 would need to be larger, heavier, and therefore more costly. Similarly, the bearing 230 could be made in more than two pieces, such as three pieces, four pieces or more.

Additionally, the inner surface 240 of the bearing 230 can have shapes other than round. For example, where the body member 72 of the torque tube 16 is shaped other than round, such as square, rectangular, star shaped, etc., the inner surface 240 can be manufactured to have a corresponding shape.

The bearing 230 can be made from any material, including plastics such as an acetal copolymer commercially available as WR902, or other materials.

During insulation of an array 11, as noted above, the piles 22 can be secured to a ground surface, for example, with cement. Optionally, with reference to FIG. 12, the member 152 can be temporarily or permanently secured to the top of the pile 22 before the cement is cured so as to aid in alignment of the piles 22 relative to each other, for example, using the alignment notches 158. However, occasionally, shifting of the piles 22 during curing of the cement can be caused by various factors which cannot always be controlled. Thus, the piles 22 may ultimately be anchored to the ground in cured cement, but partially out of alignment.

The misalignment of the upper end of the piles 22, with reference to FIG. 11, can be in the lateral direction, the vertical direction, or the angular direction A. Thus, using any one of the adjustment devices 150, 170, 190, alone can provide advantages in the ability to accommodate such misalignment of the pile 22. Further, when all three adjustment devices 150, 170, 190, are used together, misalignment of the pile 22 in any direction, vertically, laterally or angularly, can be accommodated.

The split configuration of the bearing 230 can also provide other advantages. For example, because the bearing 230 in a split configuration can be assembled around any portion of the body 72 of the torque tube 16, certain structural components of the torque tube 16, such as the connector members 74 and the flanges 77 can be permanently attached to the body 72, then the torque tube 16 can be subjected to an anti-corrosion treatment. As such, no additional components need be attached to the torque tube 16 by welding. Thus, damage to the anti-corrosion treatment by welding can be avoided. In some embodiments, the anti-corrosion treatment is hot dip galvanization. However, other anti-corrosion treatments can also be used. Reducing damage to the anti-corrosion treatment increases the likelihood that the anti-corrosion treatments will provide a longer useful life of the torque tube 16 and reduces the need for touch up work of the anti-corrosion treatment after assembly in the field.

Additionally, the split configuration of the bearing 230 and the housing 192 allows failed bearings to be replaced without the need to remove the torque tube 16 from adjacent bearings. More specifically, with reference to FIGS. 11 and 17, if the bearing member 230 were to fail, the adjustable bearing assembly 20 could be partially or entirely disassembled with the body 72 extending through the central passage of the bearing 230. Additionally, the components of the adjustable bearing assembly 20 are sized such that some or all of the components of the assembly 20 can also be replaced with the torque tube 16 in place and supported by adjacent bearing assemblies 20.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A solar energy collection system formed of a plurality of connected solar collection modules, comprising:
a plurality of piles secured to a ground surface in a plurality of parallel rows, each of the piles having an upper end and extending along a generally vertical direction relative to the ground surface;
a plurality of support frames, each of the support frames having a first structural support member comprising an elongate tubular member extending in a first direction of the support frame and rotatable about the first direction, the first direction transverse to the vertical direction, each of the first structural support members supported by at least one pile of the plurality of piles and defining a pivot axis of the support frame, each of the first structural support members including a first end and a second end opposite the first end;
a plurality of arrays of photovoltaic solar panels, each of the plurality of arrays comprising a plurality of photovoltaic solar panels, each of the support frames supporting one of the plurality of arrays, each of the plurality of arrays of photovoltaic solar panels being wired to output electrical energy at about the same voltage;
a plurality of spherical bearing assemblies disposed at the upper ends of the plurality of piles, each of the spherical bearing assemblies comprising at least a first housing portion mounted to the upper end of one of the plurality of piles, a second housing portion removably connected to the first housing portion and defining an inner bearing race when the second housing portion is connected to the first housing portion, a bushing comprising at least a first bushing portion and a second bushing portion, the first and second bushing portions defining an inner passage disposed about an outer surface of the first structural support member, the first and second bushing portions forming a generally spherical outer surface comprising a spherical portion and coupled to the inner bearing race, the generally spherical outer surface comprising radial walls extending from an inner portion of the bushing toward the outer spherical surface, the outer terminal ends of the radial walls forming a weblike spherical surface with recesses configured to accommodate lubricant, wherein each spherical bearing assembly supports a corresponding first structural support member such that the corresponding first structural support member can be adjusted angularly about a second direction and in a plane defined by the first direction and the vertical direction, the second direction transverse to the first direction and the vertical direction, and wherein a clearance is defined between the outer surface of the corresponding first structural support member and respective inner surfaces of the first and second bushing portions such that the corresponding first structural support member can rotate relative to the first and second bushing portions.

2. An adjustable solar assembly mounted to a ground surface, comprising:

at least a first pile secured to a ground surface, the pile having an upper end, the pile extending along a generally vertical direction relative to the ground surface;

at least a first support frame having a first structural support member extending in a longitudinal direction of the support frame and rotatable about the longitudinal direction, the first structural support member comprising an elongate tubular member, the longitudinal direction transverse to the vertical direction;

at least a first solar energy collection device supported by the first support frame;

at least a first spherical bearing assembly disposed at the upper end of the pile, the first spherical bearing assembly comprising a generally spherical bearing surface having a spherical portion, the first spherical bearing assembly supporting the first structural support member such that the first structural support member can be adjusted angularly about at least a first axis and in a plane defined by the longitudinal direction and the vertical direction, the first axis transverse to the vertical direction and the longitudinal direction, wherein a clearance is defined between an outermost surface of the first structural support member and an innermost surface of the first spherical bearing assembly such that the first structural support member can rotate relative to the innermost surface of the first spherical bearing assembly.

3. The adjustable solar assembly according to claim 2, wherein the first spherical bearing assembly comprises at least a housing and a bushing, the housing comprising at least a first portion secured to the upper end of the pile and a second portion removably connected to the first portion, the bushing being enclosed by the housing.

4. The adjustable solar assembly according to claim 3, wherein the first and second housing portions cooperate to define a bearing race configured to support the bushing, at least a portion of an outer surface of which is spherical.

5. The adjustable solar assembly according to claim 3, wherein the first spherical bearing assembly comprises a bushing defining an internal passage, the first structural support member extending through the internal passage, wherein the bushing is a split bushing comprising at least first and second portions, the outer surfaces of the first and second portions cooperating to form a generally spherical outer surface of the bushing.

6. The adjustable solar assembly according to claim 2, wherein the first spherical bearing assembly comprises a housing including first, second, and third portions, the first portion being mounted to the upper end of first pile, the second and third portions of the housing cooperating with the first portion to define an inner race configured to receive a bushing with at least a partially spherical outer surface and configured to support the first structural support member.

7. The adjustable solar assembly according to claim 6, wherein each of the first, second, and third portions of the housing are configured to extend approximately 120° around the bushing.

8. The adjustable solar assembly according to claim 7, wherein the bushing comprises first and second portions which are approximately the same size.

9. The adjustable solar assembly according to claim 2 additionally comprising an adjustable bearing mount, the adjustable bearing mount comprising a first mount configured to be vertically adjustable relative to the upper end of the first pile and a second mount configured to be laterally adjustable relative to the upper end of the pile, the adjustable bearing mounts connecting the first spherical bearing assembly to the upper end of the pile.

10. The adjustable solar assembly according to claim 9, wherein the first mount comprises a sleeve portion configured to receive the upper end of the pile and to be vertically adjustable relative to the pile.

11. The adjustable solar assembly according to claim 9, wherein the second mount is configured to be releasably engagable with the first mount and to be laterally adjustable relative to the first mount.

12. The adjustable solar assembly according to claim 11, wherein the second mount includes slots aligned with holes formed in the first mount so as to allow the second mount to slide laterally relative to the first mount, the slots and the holes being sized to allow threaded fasteners to extend therethrough for securing the second mount in a fixed position relative to the first mount.

13. The adjustable solar assembly according to claim 2, wherein the spherical bearing assembly comprises a bushing having a weblike generally spherical outer surface.

14. The adjustable solar assembly according to claim 13, wherein the generally spherical outer surface of the bushing comprises recesses configured to accommodate lubrication.

15. The adjustable solar assembly according to claim 2, wherein the first bearing assembly further comprises at least one of a vertical adjustment device configured to allow a vertical position of the first bearing assembly relative to the pile to be adjusted and a lateral adjustment device configured to allow a lateral position of the first bearing assembly relative to the pile to be adjusted.

16. The adjustable solar assembly according to claim 2, wherein the spherical bearing assembly comprises a bearing housing and a bearing member, the bearing member being pivotable about the first axis and pivotable in a different direction relative to the first pile.

17. The adjustable solar assembly according to claim 2, wherein the first spherical bearing assembly comprises a spilt bearing housing and a split bearing member, and wherein the first structural support member includes a body member having an outer diameter that is about equal to or smaller than an inner diameter of the split bearing member, and additionally comprising mounting components permanently fixed to the body member wherein the mounting components extend outward from the body member beyond the inner diameter of the split bearing.

18. An adjustable solar assembly, comprising:

at least a first pile secured to a ground surface, the pile extending along a generally vertical direction relative to the ground surface and having an upper end;

at least a first support frame having a first structural support member extending in a longitudinal direction of the support frame and rotatable about the longitudinal direction, the first structural support member comprising an elongate tubular member, the longitudinal direction transverse to the vertical direction;

at least a first solar energy collection device supported by the first support frame;

at least a first spherical bearing assembly disposed at the upper end of the pile, the first spherical bearing assembly comprising a generally spherical bearing surface having a spherical portion, the first spherical bearing assembly supporting the first support frame such that the first structural support member can be adjusted angularly about at least a first axis and in a plane defined by the longitudinal direction and the vertical direction, the first axis transverse to the vertical direction and the longitudinal direction; and means for allowing the first spherical bearing assembly to be adjusted angularly and laterally relative to the first axis, wherein a clearance is defined between an outermost surface of the first structural support member and an innermost surface of the first spherical bearing assembly such that the first structural support member can rotate relative to the innermost surface of the first spherical bearing assembly.

19. The adjustable solar assembly according to claim 18, wherein the spherical bearing assembly additionally comprises means for vertically adjusting a position of the first spherical bearing assembly relative to the first axis.

20. The adjustable solar assembly according to claim 18 additionally comprising means for allowing the first spherical bearing assembly to be assembled around the first structural support member with the first structural support member in a final installation position with a central longitudinal axis of the first structural support member aligned with the first axis.

21. The solar energy collection system of claim 1, wherein a length of the first bushing portion along the first direction is longer than a length of the first housing portion along the first direction.

22. The adjustable solar assembly of claim 2, wherein the first spherical bearing assembly comprises a housing portion and a bushing portion within the housing portion, wherein a length of the bushing portion along the longitudinal direction is longer than a length of the housing portion along the longitudinal direction.

23. The adjustable solar assembly of claim 18, wherein the first spherical bearing assembly comprises a housing portion and a bushing portion within the housing portion, wherein a length of the bushing portion along the longitudinal direction is longer than a length of the housing portion along the longitudinal direction.

24. The solar energy collection system of claim 1, wherein the system is a single axis tracking system such that each array tracks the sun by rotating about only the first direction.

25. The adjustable solar assembly of claim 2, wherein the assembly is a single axis tracking system such that the first solar energy collection device tracks the sun by rotating about only the longitudinal direction.

26. The adjustable solar assembly of claim 18, wherein the assembly is a single axis tracking system such that the first solar energy collection device tracks the sun by rotating about only the longitudinal direction.

\* \* \* \* \*